United States Patent [19]
Elias et al.

[11] Patent Number: 5,289,846
[45] Date of Patent: Mar. 1, 1994

[54] AUTOMATIC LIQUID REPLENISHING SYSTEM

[76] Inventors: Tariq J. Elias, 7358 Margerum Ave., San Diego, Calif. 92120; Hani E. Chika, 4521 Park Blvd., San Diego, Calif. 92116

[21] Appl. No.: 813,481

[22] Filed: Dec. 26, 1991

[51] Int. Cl.⁵ .................. F16K 21/18; F16K 37/00; B67D 5/12
[52] U.S. Cl. .................. 137/392; 116/109; 116/202; 116/227; 137/558; 141/95; 141/243; 222/66; 222/144.5; 340/619; 340/620
[58] Field of Search .......... 137/386, 392, 558; 141/95, 243; 222/65, 144.5; 116/109, 202, 227; 73/304 R; 340/619, 620

[56] References Cited

U.S. PATENT DOCUMENTS

| | | | |
|---|---|---|---|
| 3,131,710 | 5/1964 | Ludwig et al. | 137/392 |
| 3,427,252 | 2/1969 | Gaughan et al. | 137/392 |
| 3,536,925 | 10/1970 | Schmidt | 222/65 |
| 3,605,798 | 9/1971 | Green et al. | 137/392 |
| 3,782,429 | 1/1974 | Barber | 222/66 |
| 4,065,227 | 12/1977 | Rose | 137/392 |
| 4,069,838 | 1/1978 | Hansel et al. | 137/392 |
| 4,445,238 | 5/1984 | Maxhimer | 137/392 |
| 4,485,856 | 12/1984 | Dulian et al. | 141/95 |
| 4,488,664 | 12/1984 | Cleland | 222/66 |
| 4,917,155 | 4/1990 | Koblasz et al. | 141/95 |

*Primary Examiner*—George L. Walton
*Attorney, Agent, or Firm*—Ralph S. Branscomb

[57] ABSTRACT

An automatic water replenishing system is designed for use with multiple dye vats used for tinting eyeglass lenses, but the broad principles of the invention could apply to other systems used for replenishing individual ones of plural vats or reservoirs with water or some other liquid. A rotary water distributor rotates about an arc when it is signaled by water level sensors that the water in a particular vat is low. As the rotary distributor reaches the low reservoir, the LED carried by the distributor actuates a photo transistor adjacent the particular reservoir that needs replenishing, causing the motor to stop and the water supply solenoid valve to be actuated, filling the reservoir until a brief period of time after the level sensor indicates a full condition to the central control system.

15 Claims, 5 Drawing Sheets

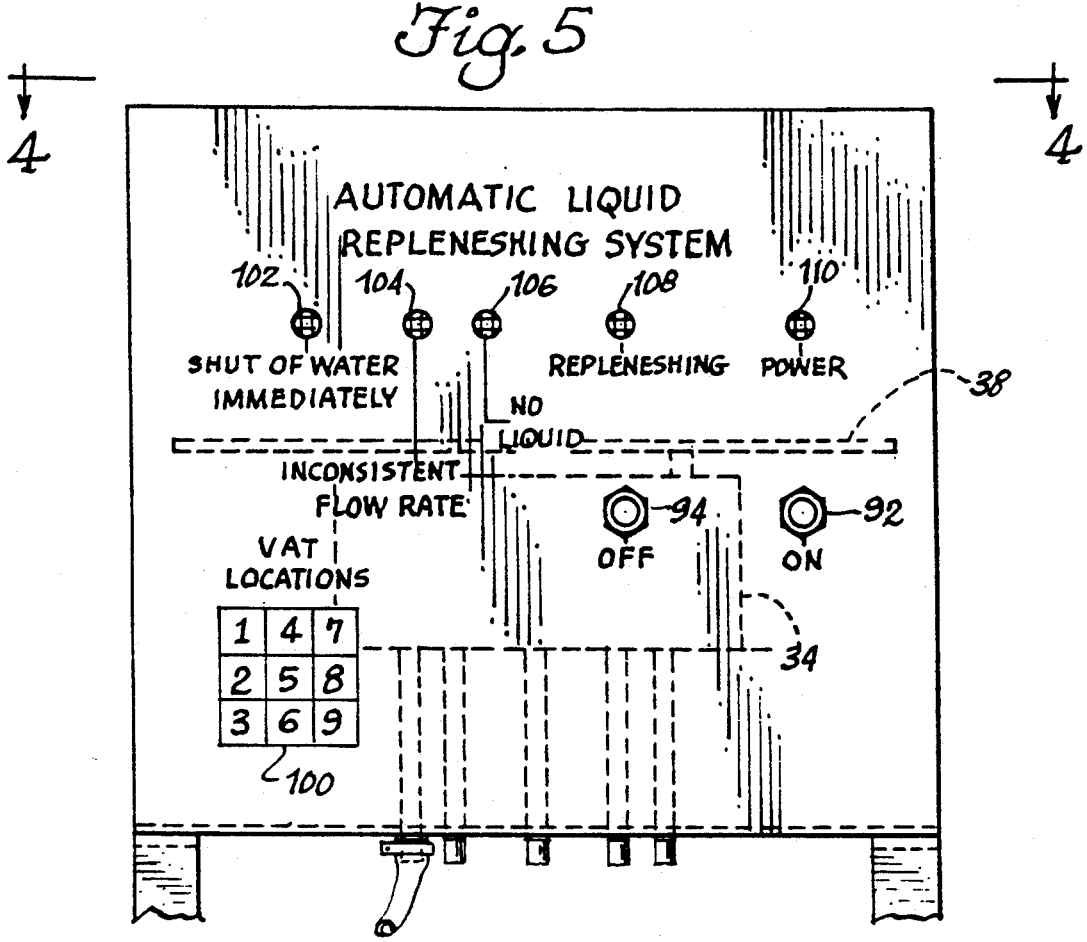
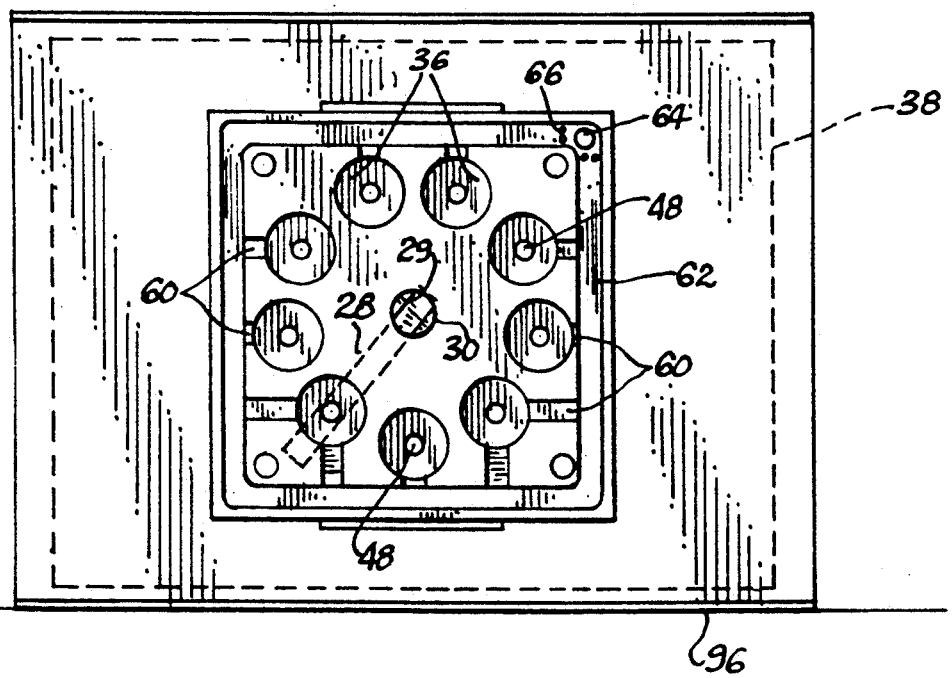

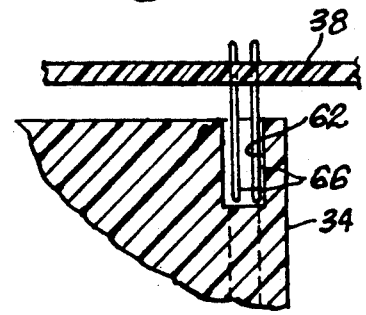
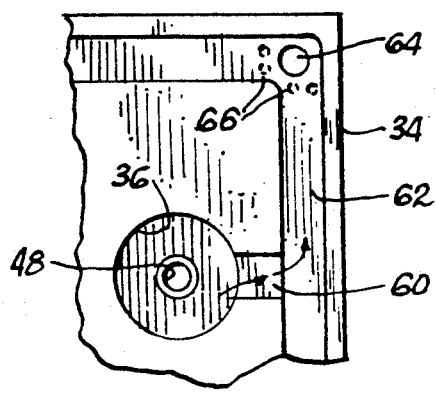
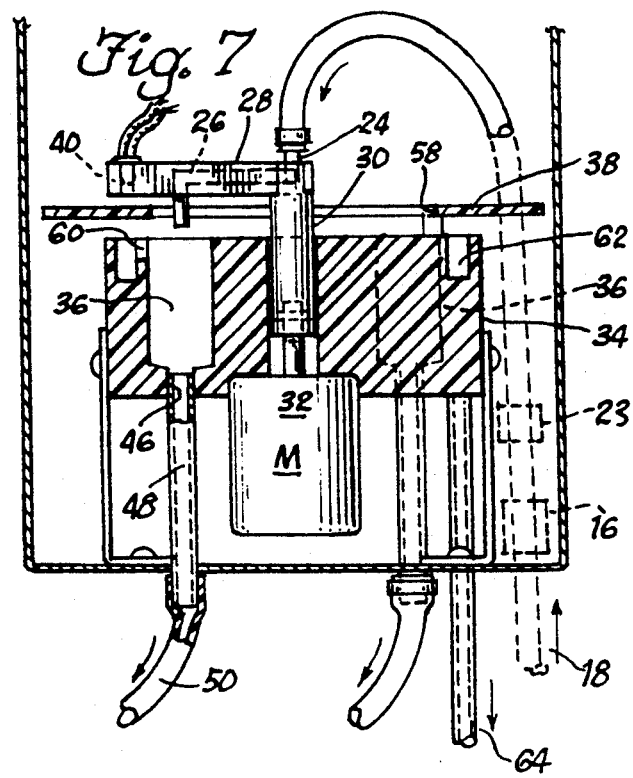
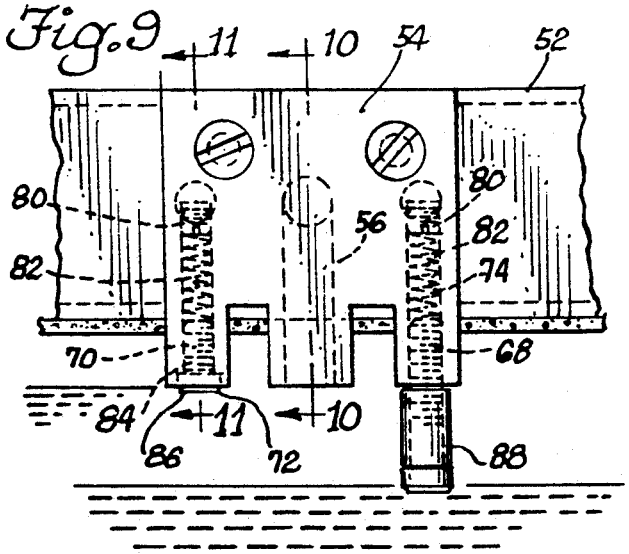
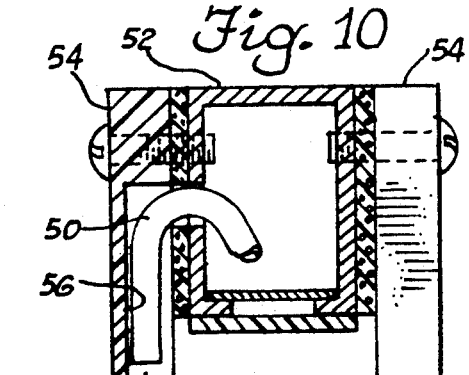
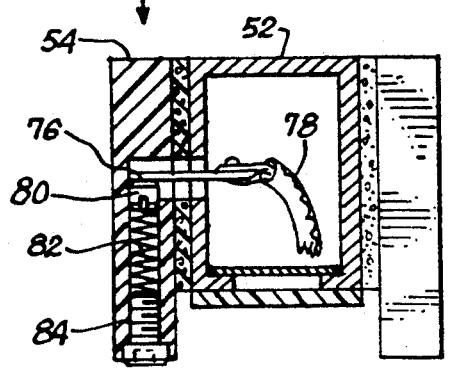

AUTOMATIC LIQUID REPLENISHING SYSTEM

BACKGROUND OF THE INVENTION

The invention is in the field of automatic control systems of the type increasingly used in industry, and in particular pertains to a means of automatically replenishing water in a number of vats which lose water due to evaporation or any other cause. The particular system disclosed and claimed herein relates to an eyeglass lens tinting system in which a number of vats, nine in the illustrated embodiment and common in the industry, each contains a water-based dye of a different color, with one of the vats possibly containing a bleach or color neutralizing solution.

During the tinting of the eyeglass lenses, generally done by an optical company, an optician or even an optometrist with a small tinting setup in a back office, the eyeglass lenses are typically either immersed in the dye for a continuous tint throughout the surface of the lens, or reciprocated up and down to various levels to create a gradient tint.

The dye solution in these vats is maintained at a temperature just under the boiling point between 200° and 210° Fahrenheit. This high temperature causes a considerable evaporation rate. Because each vat requires separate replenishment according to its own needs, replenishing the water is considered a time-wasting nuisance by the technician, who generally waits until the water level has fallen ½" to 1", before replenishing the vats.

Because the dye solution level is so low when it is replenished, and the replenishing water is generally at about room temperature since it is usually bottled distilled or purified water, the replenishing causes a considerable temperature drop in the vat. Once the temperature has been dropped in this fashion, the technician must wait until it returns to the 200° to 210° Fahrenheit level before he can continue using the vat or vats in question.

Additionally, because vat dye level maintenance is currently done manually and is not automated, the dye unit in general must never be left unattended for any period of time. There is a possibility that the unit might boil over, spilling water into the expensive heat conducting fluid that circulates beneath the vats in the vat housing manifold. Additionally, should the unit be left unattended for several hours, it is possible that one or more of the vats could dry up, producing toxic vapors.

Because almost all dye units use quart-size vats, there is not adequate room for a float-type level control system of the kind used in water closets.

There is a need, therefore, for a better system to monitor the dye fluid level in each vat, refilling the vat when necessary, and alerting the operator in the event of a boil-over or flood condition, and preferably shutting both the dye unit and the replenishing system off in such an event.

SUMMARY OF THE INVENTION

The invention is a liquid (water in the disclosed lensdipping system) distribution system which utilizes a rotary water distributor which swings a filler pipe in a 340 degree arc over a series of cups communicating with the vats of dye. The entire system is electronically controlled, and level sensors within each of the vats indicate to the central control system when a particular vat is low on water, and the control system actuates a motor which rotates the distributor until the filler pipe aligns with the appropriate filler cup. At this point, a continuously lit LED carried by the distributor illuminates a photo transistor, one of which is positioned adjacent each of the filler cups, and a signal is sent to the control system to stop the motor, freezing the distributor right over the cup that needs water. At the same time, the main water valve is opened, permitting water to flow into the cup and down into the vat in question until the vat level sensor again signals the control system that the water level in the respective vat is adequate, in which case the control system waits a brief period, generally about three seconds, and then terminates water flow by closing the valve.

Other features include various alarms and fail-safe system shut-down functions, and the possibility of a dual or alternative water supply. In production, these features will be offered as options.

BRIEF DESCRIPTION OF THE DRAWINGS

FIG. 4 is a top plan view of the distributing block illustrating the PC board and distributor in phantom;

FIG. 5 is a front elevation view of the display panel of the system;

FIG. 6 is a detail illustrating the cup overflow sensor in the overflow channel;

FIG. 7 is a section taken through the distribution block illustrating the cups and their connection to the overflow channel;

FIG. 8 is a top plan view of a fragment of a corner of the distribution block;

FIG. 9 is a detail illustrating the construction of the vat level sensors;

FIG. 10 illustrates the passage of the filler tube passing out of the distribution channel into the sensor block;

FIG. 11 is a section taken through sensor block illustrating the construction of a typical sensor;

DETAILED DESCRIPTION OF THE PREFERRED EMBODIMENT

FIG. i illustrates the overall system, in which the dye vat housing manifold 10 defines a series of cavities, nine in the illustrated unit, in which seat the dye vats 12, which are the lower portion of what will be termed in this application and in the claims as a "reservoir," which includes not only the vat 12, but also an upper cup and a filling tube in the replenishing system communicating between the vat and the upper cup into which water is actually distributed.

Figure 12:
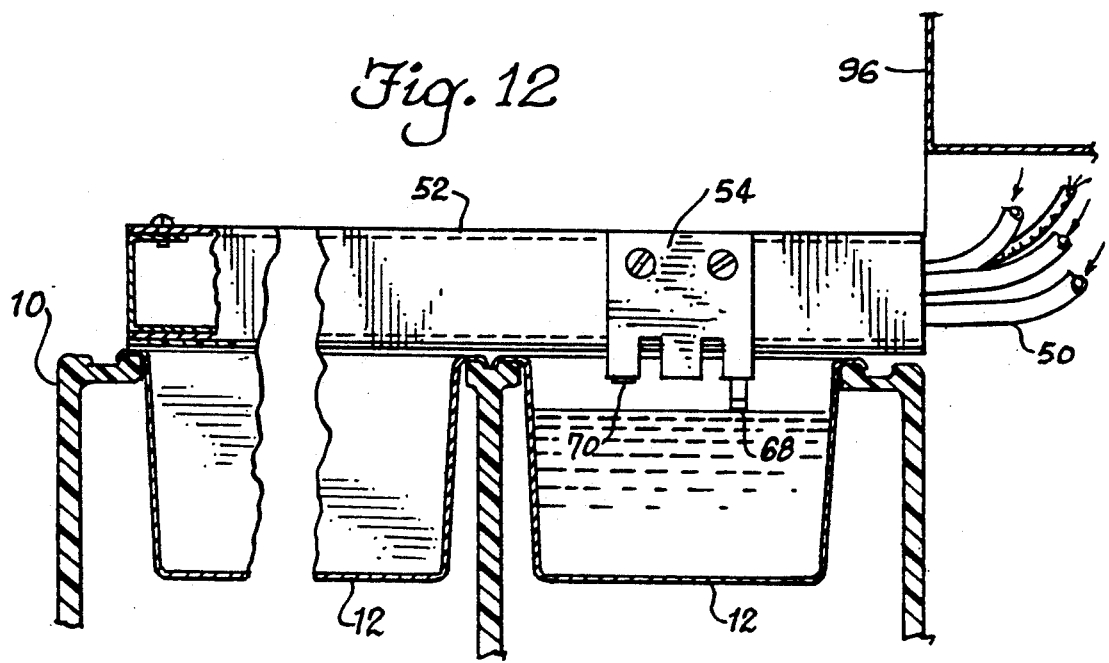
FIG. 12 is a section taken through two dye vats and a portion of the distribution arm.

The vats 12 sit inside the manifold 10 and are surrounded by a heat conductive liquid, as can be imagined by examining FIG. 12. Each of the vats have a lid 14 to reduce evaporation.

In a typical lens tinting operation without the instant invention, the vat will be maintained at a temperature between 200° and 210°. Each of the vats would contain a different color dye to permit tinting eyeglass lenses to one of several different colors. Sometimes, a lens might be dipped into one color and then another, to create a virtually endless variety of colors. Ordinarily, one of the vats contains a bleach or neutralizer, used in case the lens has been made too dark. Some neutralizers are not water-based and thus never need any replenishing water. A DIP switch 15 is incorporated into the control circuit, such that any switch can be turned off to eliminate a corresponding reservoir from the filling circuit. Non-water-based bleach solutions would have their DIP switch turned off to prevent accidental dumping of water into the bleach vat(s).

In order to periodically replenish the constantly evaporating dye solution in each of the vats, the instant invention utilizes a single solenoid valve 16 as shown in FIG. 7, to control the water distributed to all of the reservoirs. A simpler way to implement this replenishing system would be to utilize a separate solenoid valve for each of the vats, and have each of the vats independently controlled. However, because the solenoid valves are very expensive, that solution is not nearly as elegant and cost-effective as the system illustrated and described herein. A unit with nine solenoid control valves would have to be priced so high, and the unit would have to be so bulky, that it is unlikely that it would be economically viable.

The water required in the instant invention (which could be some liquid other than water, but will be described as water herein inasmuch as the optical dyes are water-based) is drawn through a source supply hose 18 and a strainer 25 from a water supply tank 20, in which a submersible pump 22 is used to elevate the water to a usable level. Alternatively or in conjunction with the water tank, water can be used directly from the tap of a municipal water system, in which case a pressure regulator 23 is required to drop the pressure to levels usable by the low pressure system of the replenishing unit.

As can be seen in FIG. 7, the supply hose 18 arcs up and enters a coupling 24 which passes water into the filler pipe 26 of the distributor 28. The distributor drops into a transverse slot 29 in the top of the vertical-axis rotary shaft 30 driven by a reversible motor (non-stepping) 32 which is mounted to the bottom of the solid distribution block 34.

On signal, the distributor 28 rotates with the shaft 30, driven by the motor 32 until the filler pipe 26 aligns with one of the cups 36, each of which defines the top of a reservoir as described and claimed herein. The cups communicate with a respective one of the vats, and the cup-communication tube-vat combination defines one reservoir unit for purposes of this description and claims, of which there are nine (reservoirs) in the instant disclosure.

Figure 1:
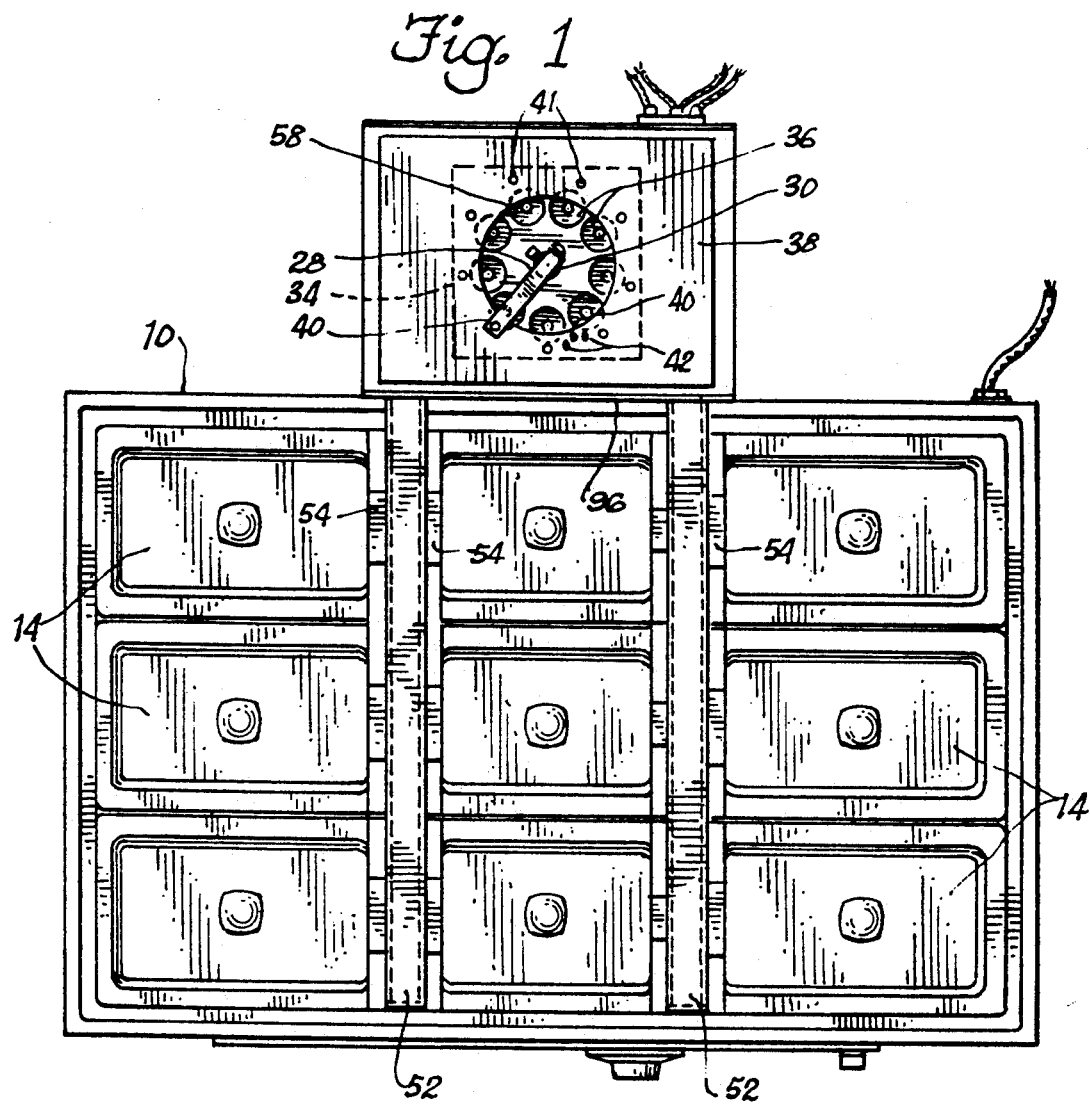
FIG. 1 is a top plan view of a typical optical lens tinting dye unit with the replenishing system attached, the top cover of the replenishing system being removed.
Figure 2:
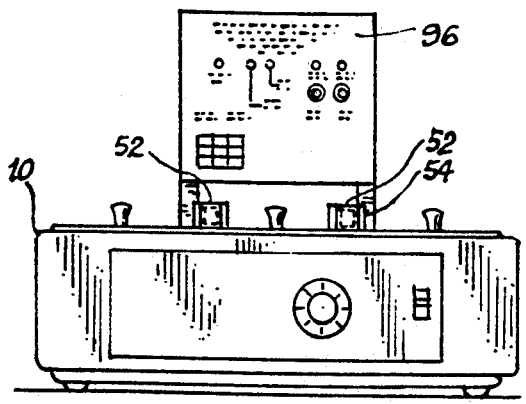
FIG. 2 is a front elevation view of the dye unit with the water replenishing system attached.
Figure 3:
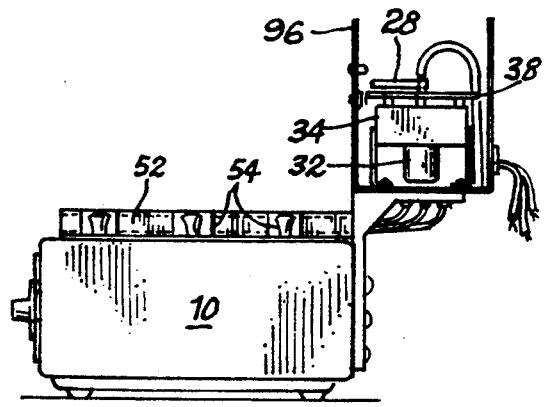
FIG. 3 is a side view of the unit as seen from FIG. 1, illustrating the dye unit and the water replenishment system.

Alignment of the distributor, and thus the filler pipe 26 with the appropriate cup is accomplished through the central electronic control system 38 (this number indicates the PC board mounting the control system, as well as the control system itself), as follows. The distributor 28 has mounted to it, in addition to the filler pipe, an LED 40 that is always on. The cups 36 are arranged around 340 degrees of the arc of a circle as illustrated in FIG. 1. Radially beyond each of the cups, on the PC board 38, is a photo transistor 41, one for each of the cups, and in the illustrated embodiment disposed basically in radial alignment with the respective cup.

Each of these photo transistors connects into the circuit on the PC board 38 Which also receives input from the water level sensors in the vats, which will be described below. On signal, the control circuit causes the motor 32 to rotate and then to stop, when a particular one of the photo transistors 41 is directly illuminated by the LED 40 carried by the distributor 28. Actuation of the motor in the first place was caused by a signal from one of the water level sensors, while illumination of the respective photo transistor causes the distributor to stop over the appropriate cup.

The rotary distribution system as described above would work adequately were there a rotary fluid coupling connecting the water supply with the rotary distributor. To avoid the requirement of such a coupling, the distributor is designed to move only 340°, after which point it reverses, so that it will rotate back and forth between the 340° arc limiting points so that the supply hose 18 is not twisted.

To achieve this, two motor-reversing photo transistors 42 are provided between a pair of the cups 36, shown in FIG. 1. At any time when either of these photo transistors is illuminated by the LED 40, the control system will automatically reverse the motor 32, causing the distributor to rotate in the opposite direction. In anticipation of the remote possibility of an electronic breakdown, a physical limit switch 44 is also placed between the two motor-reversing photo transistors 42 to make absolutely sure that the distributor does not continue to rotate and twist off the supply hose, possibly causing a disaster. When the distributor hits the mechanical limit switch, the system shuts off.

The above description should clarify the principles on which the distribution system is built. Obviously, it would be applicable to other replenishment situations other than eyeglass lens tinting dye vats, and clearly variations too numerous to mention in full could be made to the basic system. For example, the filler photo transistors could be mounted in some other location, for example centrally around the rotary shaft 30, although their position adjacent to the filler cups 36 works quite well.

Turning now to the water distribution system and the illustrated embodiment, the cups 36 are bored into the solid distribution block 34, having lower reduced bores 46 into which are inserted three-inch aluminum filler pipes 48. At the bottom of these filler pipes are the distribution tubes 50 which connect to the pipes and pass down through hollow stainless steel distribution arms 52, terminating in the respective level sensor block 54 that is attached on the side of a distribution arm for each of the vats 12. This is best shown in FIG. 10. The tube passes out through the hollow internal channel of the distribution arm, and hooks over and down through the passage way 56 cut into the block 54.

As shown best in FIG. 7, the PC board 38 is disposed about ½ inch above the distribution block 34 and has a large central hole 58 cut through it. This configuration permits the LED 40 to be operative with the level-actuated photo transistors 41 while permitting the filler pipe 26 to fill the cups 36 through the hole 58. In other words, this interleaving permits simultaneous electronic and fluid transmission to occur in the same area.

The distribution block 34 provides an overflow passage way 60 for each of the cups into the overflow channel 62, there being a drain connected to an overflow drain hose 64 in FIG. 7 to safely discharge overflow water.

In addition, two sensors 66, each having two sets of overflow sensor electrodes protrude directly from the PC board down into the overflow channel 62, terminating about a millimeter above the bottom of the channel so that the control system is made aware immediately of any cup overflow condition, and responds appropriately as will be described below.

Figure 14:
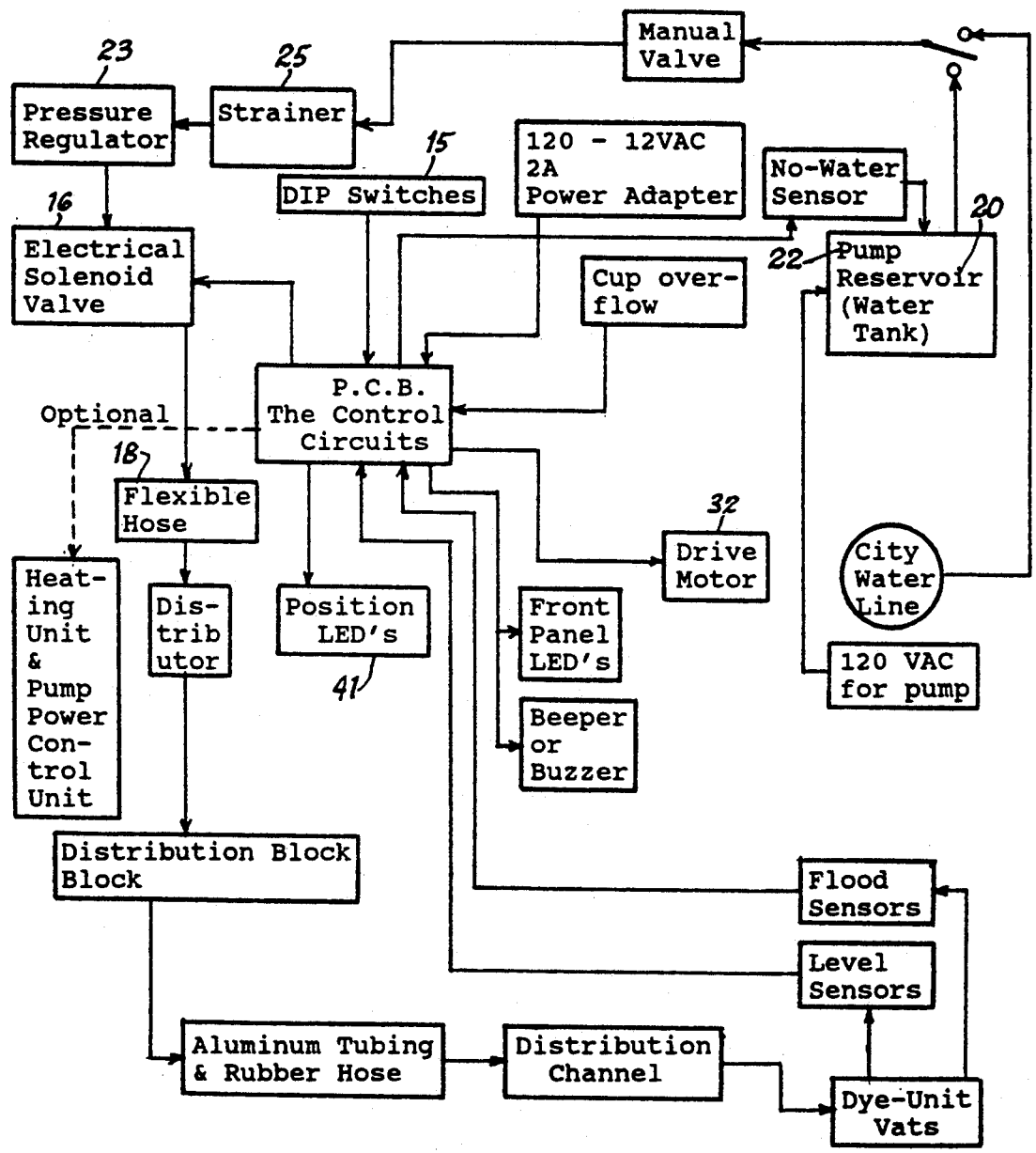

This sensor and other sensors, controls and fluid-flow mechanisms are illustrated in their logical interactions in the block diagram of FIG. 14.

The level sensor block 54 has already been mentioned in conjunction with the passageway through which the distribution tubes 50 pass. In addition, these blocks each mount a pair of sensors, the first sensor being the water level sensor 68 best shown in FIG. 9, and the flood level sensor 70, also shown in FIG. 9 and FIG. 11. These sensors are spaced apart in the block adequately such that when the block is wet, a water bridge will not cause them to short out through any adjacent structure. For the same reason, the block has depending columns 72 into which the bores 74 are defined. Within the bores, a contact 76 on the end of a connecting wire 78 is maintained in place by a set screw 80 threadedly engaged into the upper end of the bore. A coil contact spring 82 is disposed just below and pressing against the set screw, and the electrode is a stainless steel screw 84, which is screwed up into the respective bore, exposing its head 86 as the electrode itself. In the case of the fluid level sensor 68, the screw 84 extends down considerably below the bottom of the column 72, and is covered with a Teflon TM sleeve 88 to further distance the contact portion of the electrode from any structure to which it might ground.

The blocks 54 are screwed into the stainless steel sides of the distribution arms 52 as shown in FIG. 12. There is one block for each vat. When the water level drops below the level of sensor 68, a microamp current which is passed through the electrode and the water terminates, signalling the control circuit that one of the vats is low, causing the control circuit to actuate the motor 32.

Termination of the microamp current also activates the appropriate photo transistor 41 adjacent to the cup communicating with the respective vat, so that when the distributor arrives over the respective cup, the motor is de-actuated. At the same time the motor is de-actuated, the solenoid valve 16 is opened, permitting flow of water into the cup and down into the vat. This flow is shut off three seconds after the current is re-established between the level sensor 68 and the fluid in the vat so that the vat dye level rises somewhat above the top of the electrode 68. If this shut-off does not occur, there is a thirty second limit built into the system for the filling of any of the cups, to prevent continuous overflow in the event of a malfunction. Also, a four-second delay briefly immobilizes the distributor after the sensor 68 re-establishes water level contact, to ensure termination of waterflow prior to rotation of the distributor to another cup.

As indicated in FIG. 14, the electronic control system receives information input from the following sources:
1. level sensors in the vats;
2. flood sensors in the vats;
3. a no-water sensor 90 in the water tank;
4. distribution cup overflow sensor 66;
5. the power-on push button 92; and
6. the power-off push button 94.

From these signals, the control system generates a number of indicators, alarms, and actuates safety functions as described below, as indicated in the block diagram in FIG. 14. Referring first to FIG. 5, a display 100 parallels the actual physical layout of the vats and identifies each vat by number so that the operator can identify which of the vats corresponds with which of the individually numbered switches of the dip switch 15 used for excluding particular vats from the refill cycle. Above this indicator is an LED 102, labeled "shut off water immediately," which lights when a vat flood situation occurs. Two seconds after the vat flood situation is sensed, this LED flashes rapidly and is accompanied by an pulsating audible signal, and shuts off the replenishing system. The two second delay is essential because operators of the tinting machine often make waves that would momentarily actuates the alarm, and false signals would be generated if there were no delay. In any event, when LED 102 illuminates, simultaneously the main solenoid valve 16 is turned off.

LED 104 indicates that it is the cup channel sensors that picked up a cup overflow condition, and illuminates along with an audible alarm when a cup overflows, and stays on until the condition is corrected. Led 106 indicates that the tank 20 is empty. LED 108 indicates that one of the reservoirs is being replenished, and if the replenishing flow remains on for more than 30 seconds (which it shouldn't) the LED begins to flash and an audible alarm sounds, and the system shuts down. LED 110 provides a visual indication of when the power is on or off. Additionally, the system has an automatic shutoff function which actuates in case of short circuit.

Figure 13:
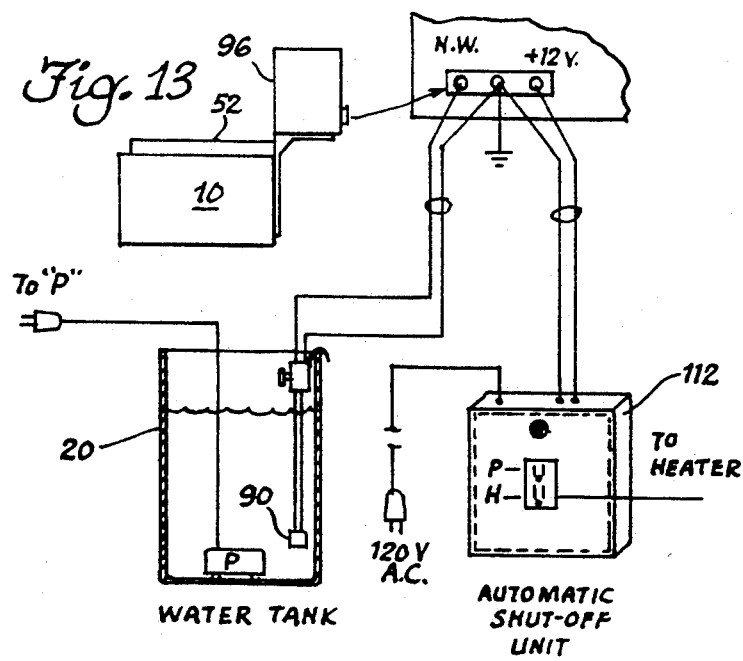
FIG. 13 is a diagrammatic illustration of the automatic shutoff system which shuts the dye unit and pump down in the event the replenishing system is shut off; and, FIG. 14 is a block diagram of the electronic control and water distribution system.

In addition to the above signaling and protective functions, an optional automatic shut-off unit 112 shown in FIG. 13 may be used to cut the power from the pump 22 in the water tank, as well as shut off the power to the dye heating unit. This would be triggered by a no-water indication from the sensor 90 or by an inconsistent flow rate condition indicated by sensor 66 or the flood sensor, so that if the unit has been left unattended, the heater will not continue to evaporate the dye after replenishing water has been exhausted. A manual valve and strainer are also shown in FIG. 14.

Although possibly seeming like a complicated way to solve a simple problem, the instant invention actually does just the opposite. With a single solenoid valve and a distribution mechanism, and relative inexpensive solid state digital electronic components, distribution of water to the nine vats is effected in a fail-safe manner which is also relatively inexpensive to put in place and to maintain. It is believed that such a system will become common-place within a relatively short period of time, due to the problems that it eliminates and the security that it provides against unfortunate accidents.

It is hereby claimed:
1. An automatic liquid replenishing system for distributing liquid on demand to any one reservoir of an array of reservoirs as needed such that the liquid level in each of said reservoirs is maintained despite evaporation and spillage, comprising:
(a) a source of liquid;
(b) a supply valve and a liquid distributor connected to said source through said supply valve, said distributor including a common filler pipe which is physically movable to selectively communicate with any one of said reservoirs to selectively deliver liquid to same;

(c) frame means maintaining said reservoirs and liquid distributor in a substantially stable and fixed predetermined configuration such that at least a portion of each reservoir is disposed in a common predetermined path and said filler pipe is movable along said path to selectively introduce liquid into selected ones of said reservoirs;

(d) motive means for moving said distributor with said filler pipe along said path into said selective communication with any one of said reservoirs; and (e) a liquid level sensor system operative to sense the individual liquid level in each of said reservoirs, said sensor system being operatively connected to said motive means to cause said motive means to move said distributor and said filler pipe along said part into fluid communication with a selective one of said at least a portion of of said reservoirs for introducing liquid therein when said liquid level has fallen below a predetermined level.

2. Structure according to claim 1 wherein said path is annular at least in part such that at least portions of each of said reservoirs are arranged in a spaced configuration in a substantially circular arc, and said distributor rotates about an axis substantially central to said circular arc to sequentially communicate with any selected one of said reservoirs.

3. Structure according to claim 2 wherein said motive means comprises a rotary electric motor.

4. Structure according to claim 3 and including an electronic control system which receives information from said level sensor system, and including a filler photo transistor for each of said reservoirs which is positioned in geometric association with the respective reservoir, and including a light source carrier by said distributor such that it can illuminate any one of said photo transistors, and said electronic control system causes said motor to rotate said distributor until said light source illuminates a particular photo transistor associated with a particular reservoir having a low level of liquid therein, whereupon said motor is stopped while said distributor is in communication with said particular reservoir, and said control system opens said valve to fill said particular reservoir.

5. Structure according to claim 4 wherein said level sensor system comprises a set of liquid level sensing electrodes, one for each of said reservoirs, said electrodes being vertically set at pre-established liquid levels in the respective reservoirs, and said electrodes connect to said electronic control system such that whenever any of said electrodes fails to define a continuous circuit through liquid in the respective reservoir, said control system actuates said motor to bring said distributor into communication with the respective reservoir.

6. Structure according to claim 5 wherein said electronic control system incorporates delay circuitry that continues to fill the respective reservoir for a pre-determined time after the respective liquid level electrode signals the electronic control system that electrical continuity has been re-established through the liquid the respective reservoir.

7. Structure according to claim 6 and including delay circuitry preventing motor re-activation for a period longer than said pre-determined time after the respective liquid level electrode signals current re-establishment.

8. Structure according to claim 4 wherein said reservoirs each includes a lower vat and an upper cup communicating through a distribution tube to the respective lower vat, and said cups are the portions of said reservoirs arranged in a circular arc.

9. Structure according to claim 8 wherein said cups are connected to a common overflow channel, and said overflow channel has a safety drain to drain water from an overflow condition occurring in said channel, and including an overflow sensor in said overflow channel operatively connected to said control system to alert same in case of cup overflow, and said control system is configured to close said valve in case of cup overflow.

10. Structure according to claim 9 wherein said cups and overflow channel are all formed in a single solid block.

11. Structure according to claim 10 wherein in each of said cups has a rigid pipe depending therefrom and passing through said block, and each cup communicates with its respective vat by means of a respective distribution tube.

12. Structure according to claim 4 wherein said motor is reversible and including a pair of motor-reversing photo transistors between two of said filler photo transistors and operatively connected to said control system such that upon illuminating either of said motor-reversing photo transistors with said light source, said motor reverses, such that said distributor can be directly connected to said water source through a hose without requiring a rotary fluid joint.

13. Structure according to claim 12 and including a motor-reversing physical safety limit switch adjacent said motor-reversing photo transistors to insure that said motor reverses in the event of failure of said motor-reversing photo transistors.

14. Structure according to claim 1 wherein said liquid source is bifurcated into a pair of alternative water supplies, one comprising a pressurized external water supply and one comprising a water tank having a pump therein to pump water to said distributor, and including a pressure regulator for regulating the pressure of water from said pressurized water supply.

15. Structure according to claim 1 and including an overflow condition sensor system for said reservoirs, said overflow condition sensor system comprising a substantially horizontal channel communicating with each of said reservoirs at substantially the same height, and a pair of electrodes extending into said channel operatively connected to said control system with which deactivates said supply valve on receiving an overflow condition signal.

* * * * *